Figure 1:
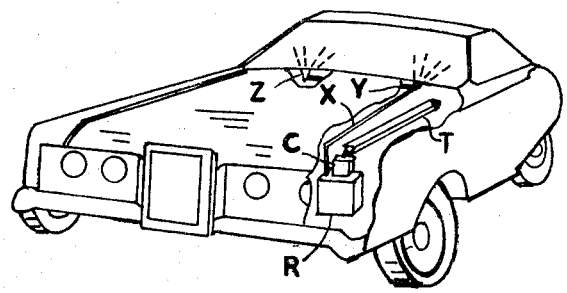

United States Patent
Somer

[11] 3,738,575
[45] June 12, 1973

[54] AUTOMATIC WINDSHIELD WASHER RESERVOIR FILLING AND MIXING MEANS

[76] Inventor: Albert Somer, 124 North 7th Street, New Hyde Park, N.Y. 11040

[22] Filed: Nov. 22, 1971

[21] Appl. No.: 200,887

[52] U.S. Cl. .................................. 239/284, 239/310
[51] Int. Cl. ............................................. B60s 1/50
[58] Field of Search .................... 239/310, 304, 284

[56] References Cited
UNITED STATES PATENTS

| | | | |
|---|---|---|---|
| 2,770,017 | 11/1956 | Oishei et al. | 239/284 |
| 2,701,897 | 2/1955 | Leming | 239/284 |
| 3,386,808 | 6/1968 | Handeland | 239/310 X |

Primary Examiner—M. Henson Wood, Jr.
Assistant Examiner—John J. Love
Attorney—James P. Malone

[57] ABSTRACT

Automatic windshield washer means for a vehicle of the type having a reservoir and spray nozzles. Means are provided to collect rain water and car wash water from the outer surface of said vehicle and means to feed said collected water to said reservoir. Control valve means are connected to said reservoir and said collecting means. The valve means has means to trap sediment and add cleaning agents to the collected water.

1 Claim, 2 Drawing Figures

Patented June 12, 1973

3,738,575

INVENTOR.

ALBERT SOMMER

AUTOMATIC WINDSHIELD WASHER RESERVOIR FILLING AND MIXING MEANS

The invention relates to windshield washer means with automatic refilling of fluid.

The present invention comprises a collecting trough which is secured under the edge of the hood. This trough is in turn connected with a tube which is connected to a control device which is attached to the reservoir body.

The control means has several openings for passage of aqueous fluids and several chambers where mixing of fluids with concentrates can be accomplished. A float valve and ball check valve are provided so the fluids can be controlled and diverted. A mixing chamber contains fluid soluble concentrate, such as a cleaning fluid. The float valve closes a ball check when the proper level in the reservoir is obtained to divert excessive incoming fluids so as to bypass the mixing chamber and prevent wasting of concentrates.

Accordingly, the principal object of the invention is to provide new and improved automatic windshield washer means.

Another object of the invention is to provide new and improved automatic windshield washer means with automatic filling from the outer surfaces of the vehicle.

Another object of the invention is to provide new and improved automatic windshield washer means with automatic filling from the outer surfaces with mixing valve means to remove sediments from the water and add cleaning solution.

Another object of the invention is to eliminate manual reservoir filling.

Another object is to provide an improved method of filling the reservoir.

Another object is to automatically maintain a full reservoir.

Another object is to automatically mix rain and wash water fluid with soluble concentrate.

Another object is to encourage the use of the windshield cleaning apparatus and promote safer driving conditions.

Another object of the invention is to provide new and improved means with automatic windshield washer means of the type having a reservoir and spray nozzle for an automobile comprising means to collect rain water and car wash water from the hood of the car, means to feed said collected water to said reservoir, and control valve means conected to said reservoir and said trough, said valve means having means to trap sediment and add cleaning agents.

These and other objects of the invention will be apparent from the following specifications and drawings of which, FIG. 1 is a perspective view of an embodiment of the invention.

Figure 2:
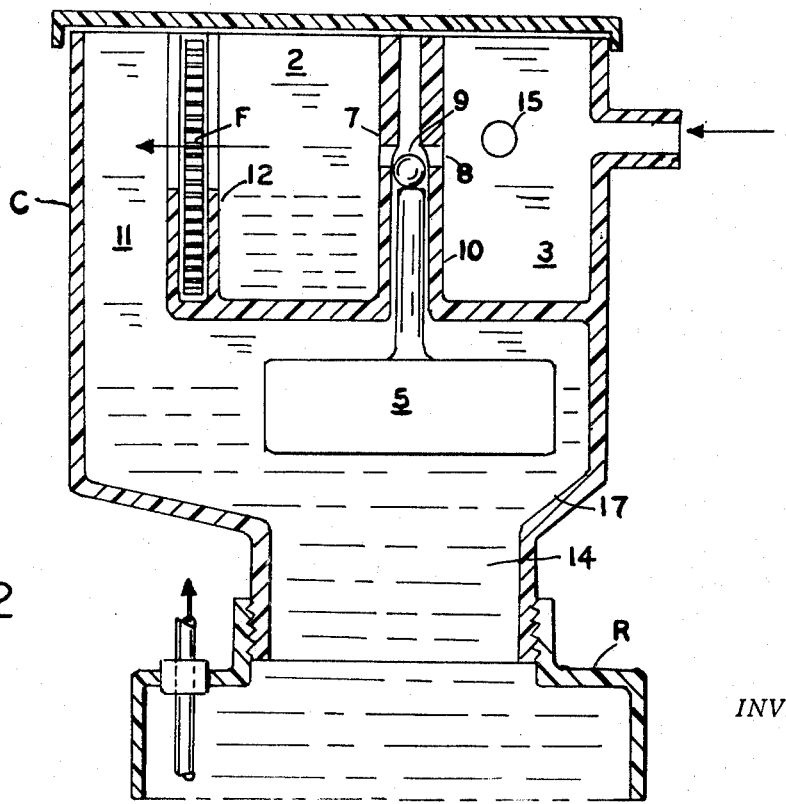

FIG. 2 is a sectional view of the control and valve means.

Referring to the drawings, the invention provides an automatic system so that it is not necessary to fill the reservoir with the windshield wiper fluid. Referring to FIG. 1, a trough T is mounted under the hood edge to collect rain water and car wash water. The trough fills the reservoir R, which is otherwise conventional, through the mixing and valve assembly C. The rest of the system is conventional with the washing fluid being fed over the tubing X to the extending spray nozzles Y and Z, which splash the cleaning fluid onto the windshield. The control and valve assembly C traps sediments and also adds a cleaning solvent, such as ammonia. Nozzles Y and Z have conventional valve controls not shown.

Fluids such as rain will be caught in the collecting trough T, then directed into the rectangular control assembly C, which fits on top of conventional reservoir R. This fluid goes into the sediment trap 3, FIG. 2. When low fluid level exists, the valve float 5, will be down thus opening the check valve ball 9, allowing fluids to pass through valve opening 7, into mixing chamber 2, which shall contain a soluble concentrate such as a cleaning agent, to mix with the aqueous fluids. When the fluid rises to a height above the concentrate retainer wall 12, it then passes through removable filter F into passageway 11 and into the neck 14, which is screwed into reservoir R. Float valve height control 17 will not allow float valve to drop any lower than this depth thereby maintaining proper operating level.

Ball check valve seat 8 operates with stainless steel ball 9. Float valve guide 10 allows proper float valve 5 movement. Overflow port 15, will release excess fluids when reservoir is at upper level.

All parts may be plastic molded except ball check 9 which is preferably stainless steel. The reservoir and its output means are conventional. The invention is illustrated in an automobile but may be used on other vehicles, such as boats, airplanes, trucks or other apparatus. The control means also has utility in chemical processing apparatus.

I claim:

1. In automatic windshield washer means of the type having a reservoir and spray nozzles for a vehicle,
   means to collect rain water and wash water from the outer surface of said vehicle,
   means to feed said collected water to said reservoir, and
   control means connected to said reservoir and said collecting means,
   said control means having first chamber means to trap sediment from said water,
   and second chamber means to add additional agents to said water,
   a valve connected between said first and second chamber means,
   a float mounted in said reservoir,
   said valve being connected to said float,
   said valve being operated by said float to close said mixing chamber to prevent wasting of said additional agents.

* * * * *